United States Patent [19]
Waller

[11] 4,126,012
[45] Nov. 21, 1978

[54] METHOD AND APPARATUS FOR SUPPORTING PIPE IN FILLED DIRT

[75] Inventor: George W. Waller, Cumming, Ga.

[73] Assignee: James W. Green, Roswell, Ga.

[21] Appl. No.: 705,401

[22] Filed: Jul. 15, 1976

[51] Int. Cl.² .............................................. F16L 1/00
[52] U.S. Cl. .................................. 405/157; 138/105; 138/106; 248/49; 248/85
[58] Field of Search ................. 61/105, 113, 14, 15, 61/13; 248/49, 85, 87, 530, 529; 138/105, 106, 107, 108; 52/155, 160

[56] References Cited

U.S. PATENT DOCUMENTS

| | | | |
|---|---|---|---|
| 631,317 | 8/1899 | Miller ........................... | 248/87 |
| 1,520,840 | 12/1924 | Murray ......................... | 138/105 X |
| 1,578,612 | 3/1926 | Scanlan ......................... | 52/155 |
| 1,854,671 | 4/1932 | Roberts .......................... | 52/155 |
| 2,472,654 | 6/1949 | Engelke ......................... | 248/49 |
| 2,851,135 | 9/1958 | Woodruff, Sr. ................ | 52/155 |
| 3,479,830 | 11/1969 | Ostarly .......................... | 61/113 |
| 3,568,455 | 3/1971 | McLaughlin et al. .......... | 61/105 |
| 3,797,260 | 3/1974 | Webb ............................. | 61/113 |
| 3,941,342 | 3/1976 | Bradshaw ...................... | 248/87 |
| 4,043,139 | 8/1977 | Scott ............................. | 61/105 X |

FOREIGN PATENT DOCUMENTS

| | | | |
|---|---|---|---|
| 671,327 | 2/1966 | Belgium ......................... | 248/530 |
| 1,227,145 | 2/1960 | France ........................... | 61/105 |
| 1,359,855 | 7/1974 | United Kingdom ............ | 61/105 |

Primary Examiner—Jacob Shapiro
Attorney, Agent, or Firm—Newton, Hopkins & Ormsby

[57] ABSTRACT

A method and apparatus for supporting pipe employing a plurality of spaced pipe carriers driven into the ground. Each pipe carrier includes a straight rigid body formed from rod stock of rectangular, i.e., square, cross-section. The lower portion of the body is provided with opposed, rigid upwardly diverging barbs, also of rectangular, i.e., square, cross-section. The upper end portion of the body carries a rigid pipe cradle. In one embodiment, the cradle is formed by spaced, laterally projecting, brackets. In other embodiments, the cradle is curvilinear, opening upwardly or downwardly. In still other embodiments, the cradle is an annulus. The cradles and barbs are formed of the same rectangular, i.e., square, rod stock as the body. The opposed surfaces of each cradle is in the same common plane with the opposed surfaces of the body and these planes are perpendicular to the surfaces of the barbs. The cradles, radially, partially or completely circumscribe the periphery of the pipe. In one embodiment the cradle is connected to a sleeve so as to be moveable in a vertical path along the body.

The method includes embedding the barbs in the unfilled dirt, by repeated stricking the upper end of pipe carrier. Then, back filling the dirt and mounting the pipe in the cradle followed by covering the pipe with fill dirt.

16 Claims, 9 Drawing Figures

METHOD AND APPARATUS FOR SUPPORTING PIPE IN FILLED DIRT

BACKGROUND OF THE INVENTION

1. Field of the Invention

This invention relates to a method and apparatus for supporting pipe and is more particularly concerned with pipe carrier and method of supporting pipe in filled or loose dirt.

2. Description of the Prior Art

In the past supports for pipes have been widely used. Many such devices include spaced anchors with auger or helical flanges so that the anchor can be rotated into the ground and a flexible strap passed between the two. U.S. Pat. No. 3,568,455 illustrates this type of device. Other type pipe carriers use rigid rods with adjustable stops for limiting the penetration of the rods into the ground and adjustable strap cradles for carrying the pipe. U.S. Pat. No. 3,170,663, illustrates this type of device.

The applicant is also aware of the following additional United States patents, in the prior art: U.S. Pat. Nos. 1,744,102, 3,155,020, 2,474,920, 3,170,663, 2,686,643, 3,342,446, 2,849,027, 3,797,260, 2,855,169, 3,810,364, 2,937,833, 3,872,947, 2,978,840.

The present invention is an improvement over the prior art by the fact that the pipe carrier is an inexpensive unitary structure which can be driven into the unfilled dirt through the filled dirt so that the barbs are embedded in, and compact, this virgin dirt, thus being disposed wholly within the unfilled dirt for positively and quite firmly arresting inadvertent movement of the pipe placed in the cradle. The pipe carrier of the present invention is simple, rugged, and easily manufactured. It lends itself well to mass production.

SUMMARY OF THE INVENTION

With the advent of plastic drain pipe which is generally light weight and somewhat flexible, a need arose for anchoring the plastic pipe in the filled-in dirt which surrounds a new building or house. The plastic pipe, however, tends, at times, to float or to sink when suspended in the soft dirt. This is particularly true during hot weather when the plastic pipe expands and is flexible. The present invention provides an inexpensive, quick way of securing such pipes in place.

Briefly, described, the pipe carrier of the present invention includes a spear having a straight, rigid metal body, the lower end portion of which is provided with opposed downwardly converging rigid barbs. A pipe cradle by the upper end portion of the body, of the spear, the cradle being U-shaped and mounted upright by its central portion or by an edge portion in either an upright or inverted position. In another embodiment a pair of horizontally disposed arms or brackets extend in cantilever fashion from the body. In still other embodiments, the cradle is a ring either fixed by one side to the side of the body or secured to a sleeve slideably carried by the body. The general plane of the barbs is perpendicular to the general plane of the cradle.

The method includes, at intervals, driving the carrier into the ground so the barbs penetrate the hard or firm ground and mounting the pipe on the cradles accompanied by filling in the loose dirt around the pipe. It also includes driving the end portions of the pipe carrier through the loose dirt to embed the end portion in the hard dirt.

DESCRIPTION OF THE PREFERRED EMBODIMENTS

Figure 1:
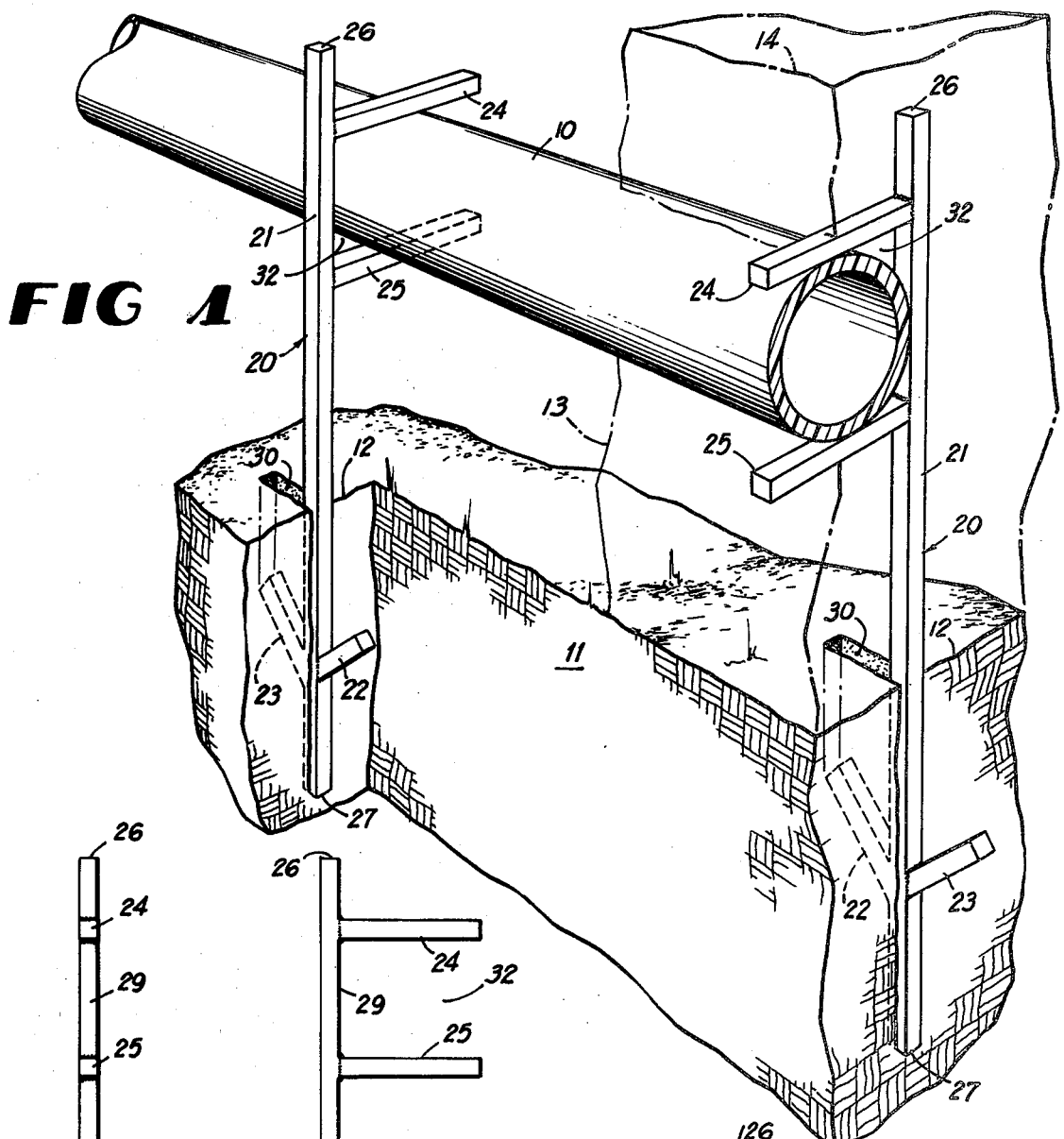
FIG. 1 is a perspective fragmentary view of a ground area containing hard unfilled dirt with a pipe passing over the unfilled dirt, the pipe being supported by spaced carriers constructed in accordance with the present invention and installed in accordance with the present invention, the filled dirt being shown in broken lines.

Referring now in detail to the embodiments chosen for the purpose of illustrating the present invention, numeral 10 in FIG. 1 denotes a drain pipe which is of the type which leads from a dwelling for the discharge of waste liquids to a sewage system. This pipe is formed of plastic, even though it will be understood by those skilled in the art that the pipe 10 may be cast iron soil pipe, or any other type of pipe which is to be maintained in a prescribed position in filled dirt. Such a pipe 10 may be received in a trench as it may extend along a prescribed path, over hard undisturbed dirt. In either event, the loose or fill dirt is filled in around the pipe 10. The undisturbed dirt or firm ground in FIG. 1 is denoted by numeral 11, being disposed below an in spaced relationship to pipe 10. This undisturbed, virgin, or unfilled ground or dirt 11 forms a bed for the support of the pipe carriers, denoted generally by numeral 20. This dirt 11 has a surface 12 which received the filled dirt, denoted by numeral 13, up to the level of the pipe 10. The filled dirt received on top of the pipe 10 is denoted by the numeral 14.

According to the present invention, the pipe carriers, such as carrier 20, each include a spear having a straight rigid body or standard 21 which is made from rod stock of rectangular preferably square cross section. This rod stock is preferably a hot roll steel which has been appropriately coated so as to resist rusting.

The rod stock is cut to lengths to provide the straight rigid body 21 and the two rigid barbs 22 and 23. Also, the same rod stock is cut to length to provide a straight rigid upper bracket or arm 24 and a straight rigid lower bracket or arm 25.

In more detail, the barbs 22 and 23 are cut angularly at their lower or proximal ends and these ends are welded, or are otherwise secured, to the opposite sides of the body 21 adjacent to but spaced from the lower end 27 of the body 21, so that each barb extends upwardly and outwardly. The upper or distal ends of the barbs 22 and 23 are cut off right-angularly, but may be cut off at any angle, as desired.

Thus, the barbs 22 and 23 taper downwardly toward each other, each at an angle of approximately 45 degrees to the body 21 so that the barb 22 is perpendicular of or at a right angle to the barb 23, the body 21 bisecting the angle between the barbs 22 and 23.

Preferably the body 21 is approximately 18 in. to 6 ft. in length and the upper end portion of the body or shank 21 is provided with the spaced, parallel laterally extending brackets 24 and 25. Brackets 24 and 25 are secured by their proximal ends to the side portions of the body 21 adjacent to the upper end 26 of body 21. The brackets 24 and 25 are of equal length and both extend perpendicularly to the body 21 so as to be disposed parallel to each other.

Figure 2:
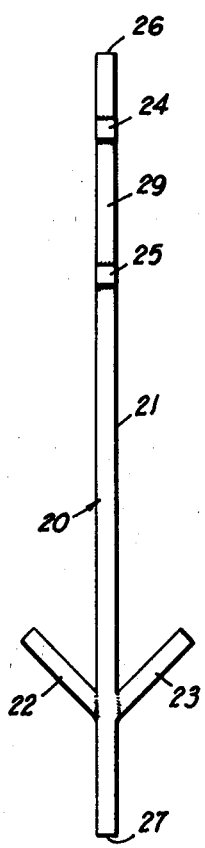
FIG. 2 is a front elevational view of the pipe carrier disclosed in FIG. 1.

As seen in FIG. 2, one side of each of the brackets 24 and 25 lie in a common plane with a side of the body 21 while an opposite side of the bracket 24 and of the bracket 25 lie in a common plane with the opposite side of the body 21.

Figure 3:
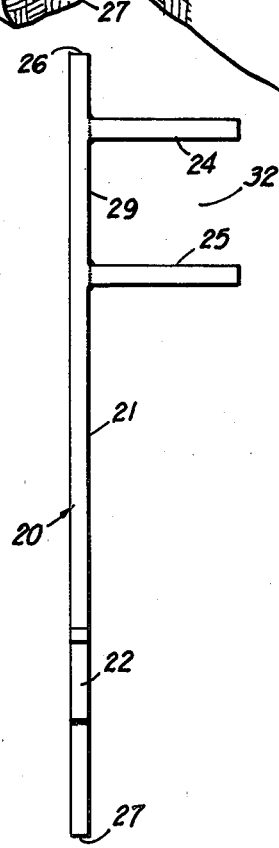
FIG. 3 is a side elevational view of the carrier disclosed in FIG. 1 and 2.

As seen in FIG. 3, a side of the barb 22 and a side of the barb 23 lie in a common plane with a surface of the body 21, while the opposite sides of the barbs 22 and 23 lie in a common plane with the opposite side of the body 21. It will be noted, however, that the planes of these sides of the barbs 22 and 23, while being parallel to each other, are perpendicular to the parallel planes of the sides of the brackets 24 and 25.

The lower end 27 of the body 21 is spaced below the lower end portions of the barbs 22 and 23 and, in the present embodiment, is formed by a right angular cut so that it is flat. End 27 may, in some instances be pointed, in the event that there is difficulty in causing the end portion of body 27 to penetrate into the hard or firm ground 11. Under normal circumstances however, the pointing or tapering of the lower end 27 of the body 21 is not necessary.

The distance between the two parallel brackets 24 and 25 is approximately equal to and preferably slightly larger than the diameter of the pipe 10 so that the pipe 10 may be readily slid into the opening between the two brackets 24 and 25, to the position in FIG. 1. The length of the brackets 24 and 25 are greater than the distance between the two brackets so as to permit lateral movement of the pipe 10 without dislodging the pipe 10 from between the brackets 24 and 25. Of course, the inner surface 29 of the body 21 which is disposed between the brackets 24 and 25 limit sidewise movement of the pipe 10 there against.

When installing the system according to the method herein, the barb end of each pipe carrier 20 is driven vertically into the ground by repeated striking with a sledge hammer of the upper end 26 of the body 21 so as to urge the end 27 down through the hard dirt 11. As the lower end portion of the pipe carrier 20 penetrates the earth, the tapered barbs 22, and 23 tend to urge the dirt sidewise and compact the dirt so that this dirt exerts lateral pressure tending to hold the pipe carrier 20 in an upright position as seen in FIG. 1. The dirt will also tend to fall back into the swath 30 cut by the barbs 22 and 23 as they penetrate the earth.

One advantage of the structure of the present device is the fact that the barbs 22 and 23 are so disposed that they will permit the pipe carrier 20 to be driven into the ground through the filled dirt 13 on which the pipe 10 will rest. This will enable the slope of the pipe 10 to be established by the filled dirt 13 and then the successive pipe carrier 20 to be driven into the ground until the lower bracket 25 rests on the surface of the filled dirt 13. Thereafter, pipe 10 can be installed over this surface of dirt 13 and the remainder of the dirt 14 filled, thereover.

If the pipe 10 can be flexed sufficiently, the bodies 21 of carriers 20 should be spaced with adjacent bodies 21 being on opposite sides of pipe 10, as shown in FIG. 1, and with their cradles, i.e., brackets 24 and 25, protruding inwardly radially of the pipe 10 to encompass or partially encompass spaced radial portions of the pipe 10 in their pipe receiving openings 32.

Usually, if a spacing of three to four feet is used between pipe carrier 20, they should be aligned with each other so that openings 32 face laterally in the same direction. Thus, the pipe 10 can be rolled from one side into the successive aligned openings.

The spear, namely body 21 should be driven to from about 8 inches to about 10 inches into the firm dirt 11.

Figure 4:
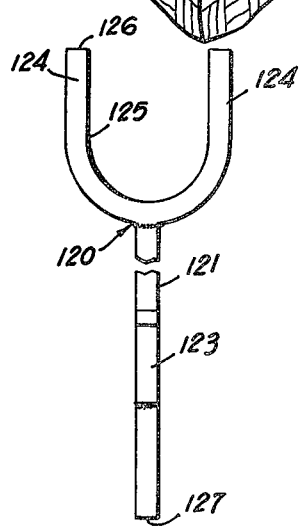
FIG. 4 is a fragmentary front elevational view of a modified former pipe carrier.
Figure 5:
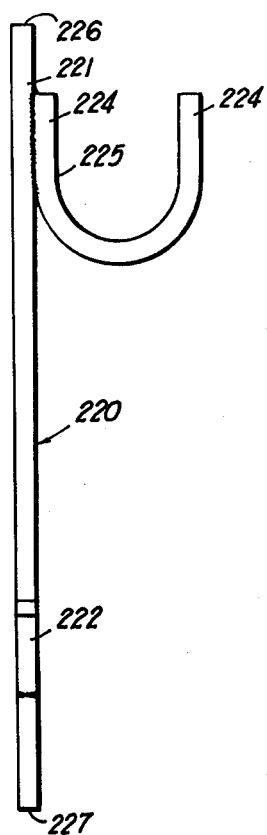
FIG. 5 is a front elevational view of another modified form of the pipe carrier of the present invention.
Figure 6:
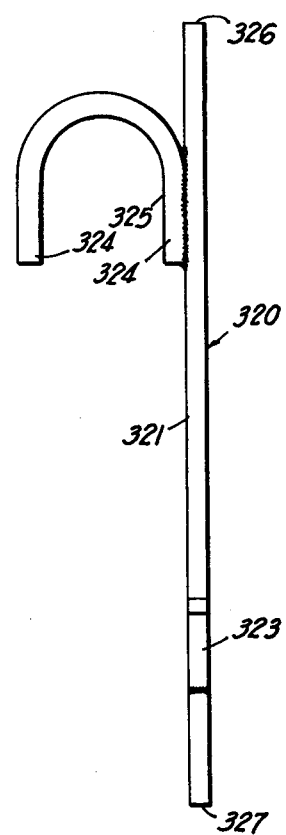
FIG. 6 is a view similar to FIG. 5 and showing still another modified form of the pipe carrier of the present invention.

In the embodiments shown in FIGS. 4, 5, and 6, rigid U-shaped curvilinear cradles 125, 225, and 325 are illustrated. A centrally located U-shaped hold-up cradle 125, is shown in FIG. 4 as being mounted by its central lower portion to the upper end 126 of the standard or body 121 of the device. The body 121 and the U-shaped cradle 125 are made from rod stock which is rectangular in cross section so that the opposite surfaces of the U-shaped cradle 125 lie in a common plane with the opposite surfaces of the body 121.

Barb 122 and barb 123, are provided at the lower portion of the body 121 so that the end 127 can be driven into the ground and the body 121 thus anchored firmly in place. Barbs 122 and 123, are identical to barbs 22 and 23.

If desired, the same U-shaped hold-up cradle 225, as the cradle 125, can be mounted in offset relationship by one edge portion to the side of the body 221. In such an arrangement, the top 226 of the body 221 is exposed so that it can be driven into the ground.

In FIG. 6, it is illustrated that the U-shaped hold-down bracket, or cradle, there designated by the numeral 325, can be disposed in an inverted position and secured by its edge portion to the side of the body 321 so as to permit the head or upper end 326 to remain exposed for being hammered.

Each of the U-shaped cradles 125, 225, and 325 has an inside generally semi-circular body portion with a diameter slightly larger than the outside diameter of the pipe 10 so as to receive the pipe 10, therein. Straight parallel legs 124, 224, and 324, which are integrally formed with the semi-circular portions of the cradles 125, 225, and 325 respectively, extend tangentially thereto and parallel to each other for confining the cradled pipe if it is moved out of engagement with the hemispherical inside surface of the cradle 125, 225, or 325, as the case may be.

The lower portions of the bodies 221 and 321 are provied with diverging barbs 222, 223, and 323, as depicted. They are identical to barbs 22 and 23.

Figure 7:
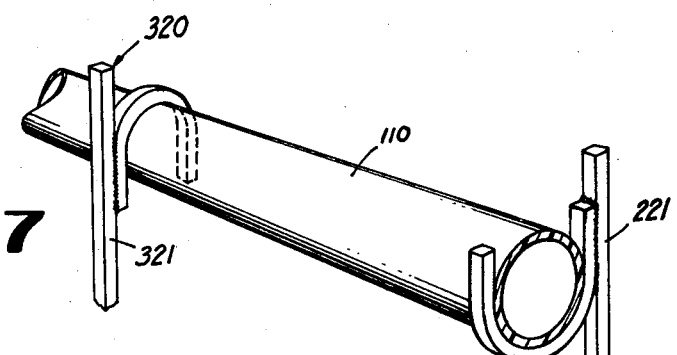
FIG. 7 is a fragmentary perspective view of a pipe being supported and arrested by pipe carrier depicted in FIGS. 5 and 6.

In use, it may be desirable to utilize the pipe carrier 120 or 220 to support the pipe as it passes from a house, dwelling, or other building. Also, the carrier 120 or 220 can be aligned along the path of the pipe to receive the pipe and prevent its sagging. At times it may be found desireable to intersperse these hold-up carriers 120 or 220 with hold-down carrier 320. Such an arrangement is illustrated in FIG. 7 which shows a pipe carrier 320 secured at one position on one side of the pipe 110 while a pipe carrier 220 is disposed on the opposite side of pipe 110 and in longitudinally spaced relationship to the carrier 320. The pipe carrier 320 arrests the pipe 110 from any appreciable upward movement while the pipe carrier 220 arrests the pipe 110 from any appreciable downward movement. Both prevent appreciable lateral movement. By staggering the pipe carriers 220 and 320 along the pipe 110, a very durable inplace structure is created.

By arranging the bodies 21 and 321 on one side of the pipe 10 and 110 and the bodies 21 and 221 on the opposite side thereof, lateral movement of the pipe 110 will be maintained at a minimum.

Preferably the leg portions 224 and 324 are the only portions which are secured to the sides of the bodies 221 and 321, respectively, since the parallel relationship of the legs 224 in FIG. 5 and 324 in FIG. 6 assure that these legs 224 and 324 are respectively parallel to the bodies 221 and 321.

The ability of the bodies 221 and 321 to be driven into the ground after the pipe 110 has been received by the concaved cradles 225 and 325 facilitate the adjustment of the pipe 110 for drainage so that no low area or sags in the pipe 110 will occur in which there can be an accumulation of liquid. This facilitates the complete drainage of the pipe 110.

Figure 8:
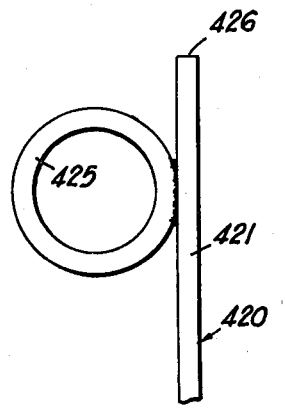
FIG. 8 is a fragmentary front elevational view of still another modified form of the pipe carrier of the present invention.

In the structure depicted in FIG. 8, the pipe cradle 425 is shown as an annulus or ring which is secured tangentially to the side portion of a body 421. This disposition exposes the upper end or cap 426 so that the cradles 425 may be successively installed on a pipe (not shown) and then the bodies 421 driven into the ground at the appropriately spaced locations, thereby supporting the pipe (not shown) at a prescribed height.

In each of the embodiments depicted in FIGS. 4–8, it will be understood that the plane of the cradle 125, 225, and 325, 425, and 525, as the case may be, is disposed so that the cradle is perpendicular to the barbs such as the barbs 123, 222, and 223. Through such an arrangement, any appreciable tilting or movement in any direction is minumized due to the wide surfaces exposed in different directions.

Figure 9:
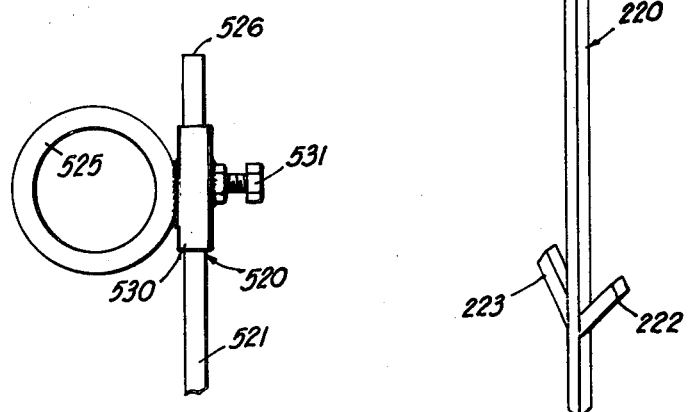
FIG. 9 is another modified form of the pipe carrier of the present invention.

In the embodiment depicted in FIG. 9, the annular or ring-like cradle 525 is secured by a peripheral portion to a sleeve 530 which is slidable carried on the body 521. Sleeve 530 is secured in place by a set screw 531 which protrudes through and is threadedly carried by the central portion of the sleeve 530. This enables the head or upper end 526 to be exposed for the purpose of driving the body 521 into the ground. In certain situations, it may be found desirable to fit the ring-like cradles 525 successively over the pipe, such as the pipe 10 or 110, and then drive the bodies or standards 521 into the ground without the cradle being installed. Thereafter, the sleeve 530 can be fitted over the upper-end portion of the body 521, provided it has not been flattened to any appreciable extent by the hammering. Of course, if such a flattening occurs, it can be readily remedied by simply filling the area which has been disfigured.

In some instances it may be found desirable to expose the ring-like cradle 525 in alignment with the barbs, such as barbs 22 and 23. This can easily be accomplished by removing the sleeve 530 from the body 521 and then re-installing it in a position perpendicular to its original position.

The length of the pipe hangers or carriers 20, 120, 220, 320, 420, 520 can vary from about 1 foot to about 8 feet. Such carriers should weigh from about ½ pound per foot to about 2 pounds per foot and preferably about 1 pound per foot.

It is now seen that the devices of the present invention lend themselves quite readily to be mass produced since each of the devices, in essentially its entirety, is formed from square or rectangular bar stock which is available quite widely. The stock is readily cut to lengths in jigs and can be assembled by welding in assembly line fashion.

I claim:

1. Apparatus for supporting a circular pipe comprising:
   (a) a straight rigid body having an upper end and a lower end;
   (b) rigid opposed barbs protruding sidewise from said body adjacent its lower ends; and
   (c) a cradle carried by the upper end portion of said body, said cradle forming an opening for receiving and confining against appreciable movement therein a radial portion of a pipe;
   (d) the lower end portion of said body being adapted to be driven into firm ground to a position which embeds the barbs in the firm ground.

2. The apparatus defined in claim 1 wherein said cradle includes a pair of parallel vertically spaced brackets, the ends of which are secured to the side of said body, for receiving said radial portion against said brackets and said upper end portion of said body.

3. The apparatus defined in claim 2 wherein said brackets project perpendicularly with respect to said barbs from said body.

4. The apparatus defined in claim 1 wherein said cradle includes a curvilinear member which partially circumscribes said pipe.

5. The apparatus defined in claim 4 wherein said curvilenear member is U-shaped and includes a semicircular central portion and a pair of parallel sides protruding tangentially from said central portion.

6. The apparatus defined in claim 5 wherein said U-shaped member is secured by its central portion to the upper end of said body.

7. The apparatus defined in claim 5 wherein said U-shaped member is secured by one of its arms to the side of said body.

8. The apparatus defined in claim 7 wherein said U-shaped member opens upwardly.

9. The apparatus defined in claim 7 wherein said U-shaped member opens downwardly.

10. The apparatus defined in claim 1 wherein said cradle is an annulus secured to one side to said body.

11. The apparatus defined in claim 1 wherein said cradle includes an annular member having a sleeve slidably carried on said body, and a setscrew threadably received by said sleeve and projecting therethrough for engagement with the side of said body, said annular member being secured by its outer periphery to said sleeve.

12. The apparatus defined in claim 1 wherein said body is rectangular in cross-section and wherein said barbs protrude from opposite surfaces, and said cradle is secured to a third surface of said body, said cradle being disposed perpendicularly to said barbs.

13. The apparatus defined in claim 12 wherein said barbs are rectangular in cross-section and correspond in thickness to the thickness of the body so that the surfaces of said barbs are disposed in common planes with opposite surfaces of said body.

14. A process for supporting a pipe in loose dirt comprising the steps of passing vertical standards into the ground in staggered relationship along the path of the pipe so that alternate standards are disposed on opposite sides of said pipe and securing said pipe to the upper portions of said standard alternate sides thereof and thereafter covering said pipe with loose dirt.

15. The process defined in claim 14 wherein the step of supporting the pipe from said standards includes securing said pipe by brackets to side portions of said pipes.

16. The process of supporting a pipe in loose dirt composing:
(a) disposing a plurality of pipe carriers at spaced locations along the path of said pipe, each of said carriers having a rigid straight body with a barbed lower end portion and a cradle for the pipe at its upper end portion;
(b) driving each of said carriers, lower end portion first, into the ground so as to embed the barbed end portion into firm dirt; and
(c) installing the pipe in said cradles.

* * * * *